(12) United States Patent
Lan et al.

(10) Patent No.: US 12,658,780 B2
(45) Date of Patent: Jun. 16, 2026

(54) SWITCHING POWER SUPPLY ARCHITECTURE

(71) Applicant: SEA SONIC ELECTRONICS CO., LTD., Taipei City (TW)

(72) Inventors: Chien-Tung Lan, Taipei City (TW); Chih-Sheng Chang, Taipei City (TW); Sheng-Chien Chou, Taipei City (TW)

(73) Assignee: SEA SONIC ELECTRONICS CO., LTD., Taipei City (TW)

( * ) Notice: Subject to any disclaimer, the term of this patent is extended or adjusted under 35 U.S.C. 154(b) by 219 days.

(21) Appl. No.: 18/675,580

(22) Filed: May 28, 2024

(65) Prior Publication Data

US 2025/0373152 A1     Dec. 4, 2025

(51) Int. Cl.
| | |
|---|---|
| *H02M 1/00* | (2007.01) |
| *H02M 1/42* | (2007.01) |
| *H02M 3/00* | (2006.01) |
| *H02M 3/335* | (2006.01) |

(52) U.S. Cl.
CPC ......... *H02M 1/007* (2021.05); *H02M 1/0035* (2021.05); *H02M 1/4241* (2013.01); *H02M 3/01* (2021.05); *H02M 3/33507* (2013.01)

(58) Field of Classification Search
CPC .. H02M 1/007; H02M 1/0035; H02M 1/4241; H02M 3/01; H02M 3/33507
See application file for complete search history.

(56) References Cited

U.S. PATENT DOCUMENTS

| | | | | |
|---|---|---|---|---|
| 2014/0009978 A1* | 1/2014 | Brinlee | ................... | H02M 3/01 |
| | | | | 363/25 |
| 2016/0322907 A1* | 11/2016 | Hwang | .................. | H02M 1/36 |

FOREIGN PATENT DOCUMENTS

| | | | | |
|---|---|---|---|---|
| CN | 110504847 | | 11/2019 | |
| CN | 116885952 | | 10/2023 | |
| CN | 116885952 A | * | 10/2023 | ........ H02M 3/33507 |
| TW | 201505348 | | 2/2015 | |
| TW | 201505348 A | * | 2/2015 | |
| WO | WO-2022023780 A1 | * | 2/2022 | ............... H02J 3/34 |

* cited by examiner

*Primary Examiner* — Crystal L Hammond
*Assistant Examiner* — Jennifer C Caulk
(74) *Attorney, Agent, or Firm* — MUNCY, GEISSLER, OLDS & LOWE, P.C.

(57) ABSTRACT

A switching power supply architecture comprises a power factor correction circuit adjusting an output for a post-stage circuit based on an output of the overall architecture; a resonant conversion circuit comparing its own output voltage with a comparison voltage value; and a wide input range step-down circuit disposed in sequence. When the comparison voltage value is greater than its own output voltage, an operating frequency of the resonant conversion circuit is the same as a resonant frequency. When the comparison voltage value is less than its own output voltage, an operating frequency of the resonant conversion circuit is greater than the resonant frequency, and the resonant conversion circuit is driven in a burst mode. Heat generated by operation of the switching power supply architecture is not concentrated in the power factor correction circuit and the resonant conversion circuit, but is dispersed and generated in associated circuits.

11 Claims, 1 Drawing Sheet

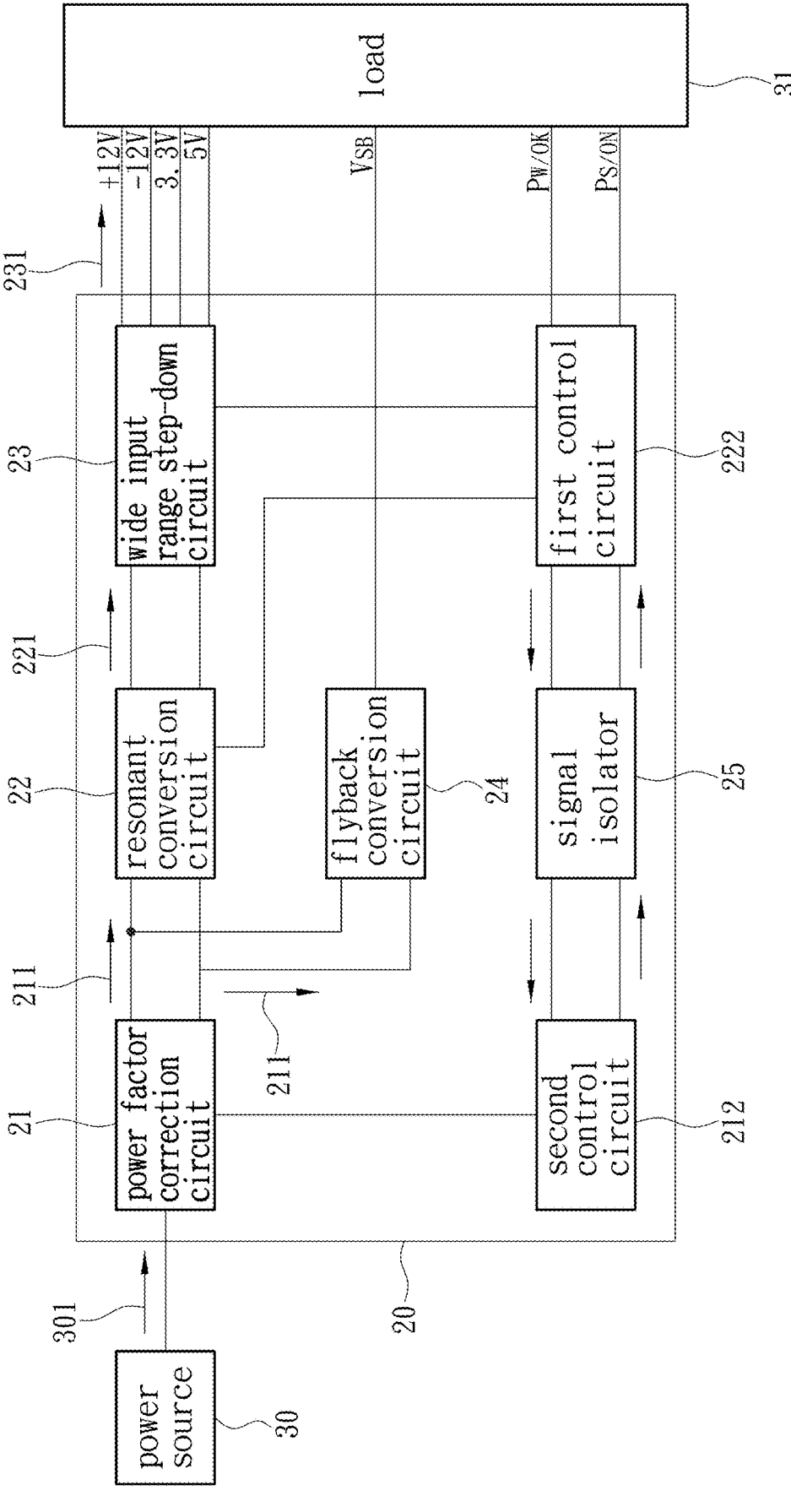

SWITCHING POWER SUPPLY ARCHITECTURE

FIELD OF THE INVENTION

The invention provides a switching power supply architecture, more particularly a switching power supply architecture in which waste heat is not concentrated and generated on a specific circuit.

BACKGROUND OF THE INVENTION

The current switching power supply architectures are disclosed in patents such as TW201505348A, CN116885952A, and CN110504847A.

The current switching power supply architecture mainly comprises a power factor correction circuit, a resonant conversion circuit and a step-down circuit. When the switching power supply architecture is implemented, the power loss is mainly distributed in the power factor correction circuit and the resonant conversion circuit. The loss of the power factor correction circuit mainly occurs in low voltage input and high voltage output. The purpose of maintaining a high voltage output by the power factor correction circuit is to meet the output regulation rate requirement of the resonant conversion circuit. The loss of the resonant conversion circuit is mainly caused by the transformer and synchronous rectification. Further, the output voltage of the resonant conversion circuit is 12V. Once the back-end load demand increases, the current will increase significantly, and the secondary copper loss of the transformer will increase significantly.

Based on the above, the current switching power supply architecture has losses concentrated in some circuits, and waste heat is also accumulated on the aforementioned circuits. Therefore, the current switching power supply architecture is generally implemented with an active heat sink. However, dissipating heat through the active heat sink cannot be applied to fanless power supplies.

SUMMARY OF THE INVENTION

A main object of the invention is to solve the problems caused by waste heat concentrated and generated on a power conversion circuit in the current switching power supply architectures.

In order to achieve the above object, the invention provides a switching power supply architecture connected to a power source and supplying electric power to at least one load. The switching power supply architecture provides an output power. The switching power supply architecture comprises a power factor correction circuit, a resonant conversion circuit and a wide input range step-down circuit. The power factor correction circuit is connected to the power source and is configured to adjust a first output voltage based on the output power currently provided, wherein the first output voltage is provided to a post-stage circuit of the power factor correction circuit. The resonant conversion circuit is the post-stage circuit of the power factor correction circuit and receives the first output voltage. The resonant conversion circuit provides a second output voltage to a post-stage circuit connected to the resonant conversion circuit, and the resonant conversion circuit is configured to perform a feedback control based on the second output voltage. The resonant conversion circuit compares the second output voltage with a comparison voltage value, wherein when the comparison voltage value is greater than the second output voltage, an operating frequency of the resonant conversion circuit is controlled to be the same as a resonant frequency of the resonant conversion circuit, and when the comparison voltage value is less than the second output voltage, the operating frequency of the resonant conversion circuit is controlled to be greater than the resonant frequency, and the resonant conversion circuit is driven in a burst mode. The wide input range step-down circuit is the post-stage circuit of the resonant conversion circuit and receives the second output voltage, and the wide input range step-down circuit is connected to the at least one load.

In one embodiment, the power factor correction circuit compares the output power with a comparison value. When the comparison value is greater than the output power, the power factor correction circuit adjusts a peak value of the first output voltage greater than a peak value of an input voltage provided by the power source, and when the comparison value is less than the output power, the power factor correction circuit adjusts the first output voltage based on the output power currently provided.

In one embodiment, when the comparison voltage value of the resonant conversion circuit is equal to the second output voltage, the operating frequency of the resonant conversion circuit is controlled to be the same as the resonant frequency.

In one embodiment, when the comparison voltage value of the resonant conversion circuit is equal to the second output voltage, the operating frequency of the resonant conversion circuit is controlled to be greater than the resonant frequency, and the resonant conversion circuit is in the burst mode.

In one embodiment, when the comparison voltage value of the resonant conversion circuit is equal to the second output voltage, the operating frequency of the resonant conversion circuit is controlled to be between the resonant frequency and a maximum operating frequency.

In one embodiment, the wide input range step-down circuit generates at least one third output voltage provided to the at least one load, and a voltage value of the at least one third output voltage ranges between 3.3 volts and 12 volts.

In one embodiment, a voltage value of the first output voltage ranges between 140 volts and 420 volts.

In one embodiment, a voltage value of the second output voltage ranges between 16 volts and 60 volts.

In one embodiment, the switching power supply architecture comprises a first control circuit serving as an auxiliary circuit of the resonant conversion circuit, a second control circuit serving as an auxiliary circuit of the power factor correction circuit, and a signal isolator connected to the first control circuit and the second control circuit.

In one embodiment, the switching power supply architecture comprises a flyback conversion circuit connected to the power factor correction circuit and receiving the first output voltage.

In one embodiment, the power factor correction circuit is configured to adjust the first output voltage based on an input and the current output power, and the first output voltage is provided to the post-stage circuit of the power factor correction circuit.

Through the foregoing implementation of the invention, the invention has the following characteristics compared with the prior art: the power factor correction circuit, the resonant conversion circuit and the wide input range step-down circuit of the invention can adjust their operations according to an output light load or heavy load to avoid excessive concentration of losses on some of the circuits, so that losses are dispersed in the circuits at various levels to achieve an object of heat dispersion, which is beneficial to applications in a high-power density power supply or a fanless power supply.

BRIEF DESCRIPTION OF THE DRAWINGS

The sole FIGURE is a schematic diagram of composition of a switching power supply architecture of the invention.

DETAILED DESCRIPTION OF THE PREFERRED EMBODIMENTS

The detailed description and technical content of the invention are described below with reference to the accompanying drawings.

Please refer to the FIGURE. The invention provides a switching power supply architecture 20. The switching power supply architecture 20 aims to solve the problem that waste heat is concentrated and generated on some main circuits during operation in conventional architectures and require implementation with a heat dissipation component. The switching power supply architecture 20 of the invention can be applied to a high-power density power supply or a fanless power supply. The switching power supply architecture 20 is connected to a power source 30 and supplies electric power to at least one load 31. The switching power supply architecture 20 provides an output power, and the output power refers to a current total output power of the switching power supply architecture 20, and is not a power provided for the single load 31. The power source 30 is an alternating current, and the power source 30 has an input voltage 301. In one embodiment, the voltage value of the input voltage 301 ranges between 90 volts and 264 volts.

The switching power supply architecture 20 comprises a power factor correction circuit 21, a resonant conversion circuit 22 and a wide input range step-down circuit 23. The power factor correction circuit 21 is connected to the power source 30. The power factor correction circuit 21 is configured to adjust a first output voltage 211 provided to a post-stage circuit of the power factor correction circuit 21 based on the current output power. Output of the power factor correction circuit 21 is a direct current. In one embodiment, the voltage value of the first output voltage 211 ranges between 140 volts and 420 volts. In one embodiment, the power factor correction circuit 21 also adjusts the first output voltage 211 provided to a post-stage circuit based on an input and the current output power. The aforementioned input is an input of the power factor correction circuit 21.

The resonant conversion circuit 22 is the post-stage circuit of the power factor correction circuit 21. The resonant conversion circuit 22 is an LLC resonant conversion circuit. The resonant conversion circuit 22 receives the first output voltage 211 and provides a second output voltage 221 to a post-stage circuit connected to the resonant conversion circuit 22, and an output of the resonant conversion circuit 22 is a direct current. The resonant conversion circuit 22 is configured to perform a feedback control based on the second output voltage 221. The resonant conversion circuit 22 has a comparison voltage value. The comparison voltage value is generated based on design parameters of an auxiliary circuit of the resonant conversion circuit 22. The auxiliary circuit is a part that drives operation of the resonant conversion circuit 22 and is hereinafter referred to as a first control circuit 222. In one embodiment, the first control circuit 222 is implemented as an analog control chip or a digital control chip. The comparison voltage value is defined based on an overall design of the switching power supply architecture 20. In one embodiment, the comparison voltage value is 60 volts. Based on the above, the resonant conversion circuit 22 compares the second output voltage 221 with the comparison voltage value. When the comparison voltage value is greater than the second output voltage 221, the resonant conversion circuit 22 is controlled in an open loop, so that an operating frequency of the resonant conversion circuit 22 is the same as a resonant frequency (Fo) of the resonant conversion circuit 22, and the resonant conversion circuit 22 is implemented with a maximum conversion efficiency. In addition, the resonant frequency (Fo) is generated based on design parameters of the resonant conversion circuit 22. On the other hand, when the comparison voltage value is less than the second output voltage 221, the resonant conversion circuit 22 is controlled in a closed loop so that the operating frequency is greater than the resonant frequency (Fo). At the same time, the resonant conversion circuit 22 is driven in a burst mode, the resonant conversion circuit 22 will improve a conversion efficiency at light load and stabilize the second output voltage 221. The resonant conversion circuit 22 of the invention operates in a zero-voltage switching (ZVS) mode under high load conditions. The second output voltage 221 of the resonant conversion circuit 22 changes within a range, which can effectively reduce an output current of the resonant conversion circuit 22 and reduce loss and generation of waste heat.

Based on the above, in one embodiment, when the second output voltage 221 is equal to the comparison voltage value, the resonant conversion circuit 22 is controlled in a closed loop, the operating frequency is greater than the resonant frequency (Fo), and driving of the resonant conversion circuit 22 is in the burst mode. The invention is not limited to being implemented merely based on the above description. In another embodiment, when the second output voltage 221 is equal to the comparison voltage value, the operating frequency of the resonant conversion circuit 22 is the same as the resonant frequency (Fo). In yet another embodiment, when the second output voltage 221 is equal to the comparison voltage value, the operating frequency of the resonant conversion circuit 22 is between the resonant frequency (Fo) and a maximum operating frequency.

The wide input range step-down circuit 23 is a post-stage circuit of the resonant conversion circuit 22, and the wide input range step-down circuit 23 is connected to the at least one load 31. The wide input range step-down circuit 23 receives the second output voltage 221, and after stepping down the second output voltage 221, the wide input range step-down circuit 23 provides at least one third output voltage 231. The at least one third output voltage 231 is an output of the switching power supply architecture 20, and an output of the wide input range step-down circuit 23 is a direct current. In one embodiment, a voltage value of the at least one third output voltage 231 output from the wide input range step-down circuit 23 is set according to the ATX specification. In one embodiment, the voltage value of the at least one third output voltage 231 ranges between 3.3 volts and 12 volts. An input voltage range of the wide input range step-down circuit 23 corresponds to a range of the second output voltage 221 of the resonant conversion circuit 22. In one embodiment, the second output voltage 221 ranges from 16 volts to 60 volts.

Please refer to the FIGURE again. In one embodiment, the power factor correction circuit 21 has a comparison value for comparing the output power. The comparison value and the comparison voltage value described in the previous paragraph are also defined based on an overall design of the switching power supply architecture 20. The comparison value can be 60% of a rated value of the output power, that is, the comparison value serves as a boundary for the switching power supply architecture 20 being light loaded or heavy loaded. The comparison value is generated based on design parameters of an auxiliary circuit of the power factor correction circuit 21. The auxiliary circuit is a part that controls operation of the power factor correction circuit 21, and is hereinafter referred to as a second control circuit 212. In one embodiment, the second control circuit 212 is implemented as a digital control chip. The comparison value is defined by at least one execution program written in the digital control chip. The second control circuit 212 obtains the output power of the switching power supply architecture 20 in a direct manner or an indirect manner. The power factor correction circuit 21 compares the output power with the comparison value. When the comparison value is greater than the output power, that is, when the output power is less than 60% of a rated value of the output power, the power factor correction circuit 21 makes the first output voltage 211 greater than a peak value of the input voltage 301 provided by the power source 30. More specifically, the power factor correction circuit 21 adjusts a peak value of the first output voltage 211 slightly greater than a peak value of the input voltage 301, for example, the peak value of the first output voltage 211 is 7~10 volts greater than the peak value of the input voltage 301. A peak value of the first output voltage 211 still needs to take withstand voltages of components into consideration. Through the above, the power factor correction circuit 21 can be maintained to effectively adjust a power factor, and a conversion efficiency can be improved at the same time, and the power factor correction circuit 21 adjusts a voltage value of the first output voltage 211 through control of the second control circuit 212. On the other hand, when the comparison value is less than the output power, that is, when the output power is greater than 60% of a rated value of the output power, the power factor correction circuit 21 adjusts the first output voltage 211 based on the current output power. In this state, a voltage value of the first output voltage 211 still needs to ensure implementation of a power-off hold up time.

In one embodiment, in addition to comprising a switched capacitor converter, the wide input range step-down circuit 23 further comprises a dual phase three-level buck converter or a regulated hybrid switched capacitor converter.

Please refer to the FIGURE again. In one embodiment, the switching power supply architecture 20 comprises a flyback conversion circuit 24 connected to the power factor correction circuit 21. The flyback conversion circuit 24 is mainly used to provide a stand-by voltage (VSB) required in the ATX specification. The flyback conversion circuit 24 receives the first output voltage 211 and performs power conversion. If the flyback conversion circuit 24 is not damaged, the flyback conversion circuit 24 will provide the aforementioned stand-by voltage as long as the first output voltage 211 is obtained. The aforementioned stand-by voltage can be 5 volts or 12 volts depending on implementation.

Please refer to the FIGURE again. In one embodiment, the switching power supply architecture 20 comprises a signal isolator 25 connected to the first control circuit 222 and the second control circuit 212. The signal isolator 25 serves as a relay for signal transmission between the first control circuit 222 and the second control circuit 212. The signal isolator 25 is capable of simplifying a wiring of the switching power supply architecture 20.

6

What is claimed is:

1. A switching power supply architecture, connected to a power source and supplying electric power to at least one load, the switching power supply architecture providing an output power, and the switching power supply architecture comprising:

a power factor correction circuit, connected to the power source, the power factor correction circuit configured to adjust a first output voltage based on the output power currently provided, wherein the first output voltage is provided to a post-stage circuit of the power factor correction circuit;

a resonant conversion circuit, being the post-stage circuit of the power factor correction circuit and receiving the first output voltage, the resonant conversion circuit providing a second output voltage to a post-stage circuit connected to the resonant conversion circuit, and the resonant conversion circuit configured to perform a feedback control based on the second output voltage, and the resonant conversion circuit comparing the second output voltage with a comparison voltage value, wherein when the comparison voltage value is greater than the second output voltage, an operating frequency of the resonant conversion circuit is controlled to be the same as a resonant frequency of the resonant conversion circuit, and when the comparison voltage value is less than the second output voltage, the operating frequency of the resonant conversion circuit is controlled to be greater than the resonant frequency, and the resonant conversion circuit is driven in a burst mode; and a wide input range step-down circuit, being the post-stage circuit of the resonant conversion circuit and receiving the second output voltage, and the wide input range step-down circuit connected to the at least one load.

2. The switching power supply architecture as claimed in claim 1, wherein the power factor correction circuit is configured to compare the output power with a comparison value, when the comparison value is greater than the output power, the power factor correction circuit adjusts a peak value of the first output voltage greater than a peak value of an input voltage provided by the power source, and when the comparison value is less than the output power, the power factor correction circuit adjusts the first output voltage based on the output power currently provided.

3. The switching power supply architecture as claimed in claim 1, wherein when the comparison voltage value of the resonant conversion circuit is equal to the second output voltage, the operating frequency of the resonant conversion circuit is controlled to be the same as the resonant frequency.

4. The switching power supply architecture as claimed in claim 1, wherein when the comparison voltage value of the resonant conversion circuit is equal to the second output voltage, the operating frequency of the resonant conversion circuit is controlled to be greater than the resonant frequency, and the resonant conversion circuit is in the burst mode.

5. The switching power supply architecture as claimed in claim 1, wherein when the comparison voltage value of the resonant conversion circuit is equal to the second output voltage, the operating frequency of the resonant conversion circuit is controlled to be between the resonant frequency and a maximum operating frequency.

6. The switching power supply architecture as claimed in claim 1, wherein the wide input range step-down circuit generates at least one third output voltage provided to the at least one load, and a voltage value of the at least one third output voltage ranges between 3.3 volts and 12 volts.

7. The switching power supply architecture as claimed in claim 6, wherein a voltage value of the first output voltage ranges between 140 volts and 420 volts.

8. The switching power supply architecture as claimed in claim 7, wherein a voltage value of the second output voltage ranges between 16 volts and 60 volts.

9. The switching power supply architecture as claimed in claim 8, wherein the switching power supply architecture comprises a first control circuit serving as an auxiliary circuit of the resonant conversion circuit, a second control circuit serving as an auxiliary circuit of the power factor correction circuit, and a signal isolator connected to the first control circuit and the second control circuit.

10. The switching power supply architecture as claimed in claim 9, wherein the switching power supply architecture comprises a flyback conversion circuit connected to the power factor correction circuit and receiving the first output voltage.

11. The switching power supply architecture as claimed in claim 10, wherein the power factor correction circuit is configured to adjust the first output voltage based on an input and the output power currently provided, and the first output voltage is provided to the post-stage circuit of the power factor correction circuit.

* * * * *